United States Patent

Ito et al.

[11] Patent Number: 5,844,952
[45] Date of Patent: Dec. 1, 1998

[54] TIME DIVERSITY RECEIVER

[75] Inventors: Shogo Ito, Yokohama; Yoshiaki Hirai, Urawa; Toshihiro Nozawa, Iida, all of Japan

[73] Assignee: NTT Mobile Communications Network Inc., Tokyo, Japan

[21] Appl. No.: 842,513

[22] Filed: Apr. 24, 1997

Related U.S. Application Data

[63] Continuation of Ser. No. 351,373, filed as PCT/JP94/00400 Mar. 14, 1994 published as WO94/27389 Nov. 24, 1994, abandoned.

[30] Foreign Application Priority Data

May 19, 1993 [JP] Japan ................................. 5-117216

[51] Int. Cl.$^6$ ................................. H04B 7/10; H04L 1/02
[52] U.S. Cl. .............................................. 375/347; 455/135
[58] Field of Search ..................... 375/346, 347, 375/349, 267; 455/135, 136

[56] References Cited

U.S. PATENT DOCUMENTS

| | | | |
|---|---|---|---|
| 4,001,692 | 1/1977 | Fenwick et al. | 371/36 |
| 4,128,809 | 12/1978 | Kage | 325/324 |
| 4,596,024 | 6/1986 | Thomson | 375/100 |
| 4,621,368 | 11/1986 | Onoe et al. | 375/347 |
| 4,715,048 | 12/1987 | Masamura | 375/347 |
| 5,109,392 | 4/1992 | McDonald | 375/347 |
| 5,195,109 | 3/1993 | Bochmann et al. | 375/347 |
| 5,357,502 | 10/1994 | Castelain et al. | 375/347 |
| 5,440,590 | 8/1995 | Birchler et al. | 375/347 |

FOREIGN PATENT DOCUMENTS

| | | |
|---|---|---|
| 44-17408 | 7/1969 | Japan . |
| 54-3412 | 1/1979 | Japan . |
| 60-501387 | 8/1985 | Japan . |
| 63-28146 | 2/1988 | Japan . |
| 1129628 | 5/1989 | Japan . |
| 4368033 | 12/1992 | Japan . |

OTHER PUBLICATIONS

BER Performance with Time Diversity Reception (Brief Translation of English) by Yoshiaki Hirai et al. of NTT Mobile comm. Network Inc.

*Primary Examiner*—Don N. Vo
*Attorney, Agent, or Firm*—Pillsbury Madison & Sutro LLP

[57] ABSTRACT

In a time diversity receiver, where in time diversity is performed using the detector output, without any use of a receiving level detection circuit, thereby simplifying the receiver circuitry and reducing power consumption.

5 Claims, 7 Drawing Sheets

TIME DIVERSITY RECEIVER

This is a continuation of application Ser. No. 08/351,373, filed as PCT/JP94/00400 Mar. 14, 1994 published as WO94/27389 Nov. 24, 1994, abandoned.

BACKGROUND OF THE INVENTION

1. Field of the Invention

This invention relates to receivers which perform time diversity reception to facilitate the transmission of high-quality signals in radio communications which are subject to fading. It can be utilized for receivers in selective radio paging and other mobile radio communication systems.

2. Description of the Related Art

Figure 1:
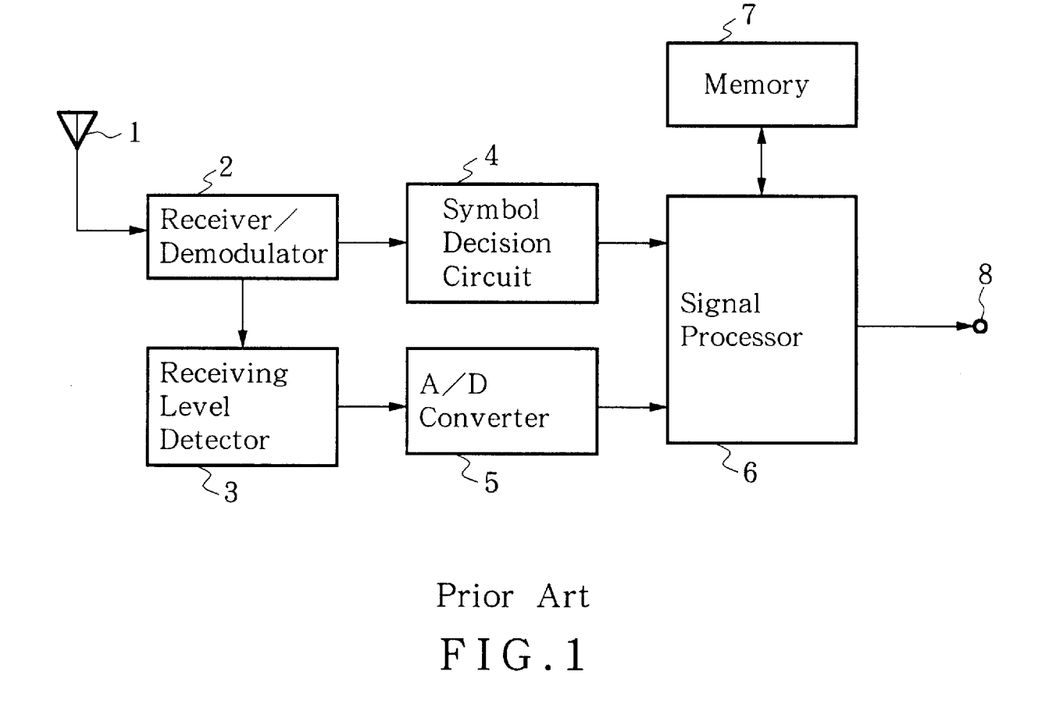
FIG. 1 shows the constitution of a conventional time diversity receiver which performs time diversity reception processing by means of receiving level detection.

FIG. 1 shows the constitution of a conventional receiver which performs time diversity reception based on the receiving level. At the transmitting side, a signal comprising the same symbols is transmitted a plurality of times. FIG. 1 described below for the case where a binary code is being received.

The signal received via antenna 1 is input to receiver/demodulator 2 and receiving level detector 3. The detector output signal that is output from receiver/demodulator 2 is subjected to symbol decision to determine the binary value (0 or 1) of the signal in symbol decision circuit 4, and is then input to signal processor 6 which performs the time diversity processing. The receiving level signal that is output from receiving level detector 3 is also input to signal processor 6 after it has been sampled by A/D converter 5. Signal processor 6 compares, for each symbol, the sampled value of the receiving level of the signal that has just been received, and the sampled value of the receiving level of a signal received up to and including the preivously received signal, which is stored in memory 7, and performs time diversity processing, whereby the binary data corresponding to the higher sampled value of the receiving level is selected. After the completion of this time diversity reception processing, signal processor 6 stores in memory 7 the sampled value and the binary data corresponding to it, and also outputs the binary data terminal 8. By repeating these operations, high-quality signal transmission can be achieved in mobile radio communication channels subject to fading.

However, a problem that has been encountered with conventional time diversity receivers of this sort is that because receiving level detector 3 is necessary in order to perform time diversity reception processing, whereby high-quality signal transmission can be achieved, the circuitry becomes complex and power consumption increases.

The purpose of the present invention is to provide a time diversity receiver which eliminates the increase in circuit complexity and power consumption that result from the use of a receiving level detector, and which therefore has lower power consumption.

SUMMARY OF THE INVENTION

This invention provides a time diversity receiver which receives a signal comprising the same symbols transmitted a plurality of times and which has a time diversity processing means which performs diversity processing, and which is characterised in that the aforementioned time diversity processing means performs time diversity reception processing using the detector output for a signal received by retransmission and the detector output for previously received signals.

A time diversity receiver according to this invention has a sampling circuit which samples the detector output, and a memory which stores these sampled values; and the time diversity processing means includes (1) a means which compares, for each symbol of identical received signals, the absolute value of the sampled value of the detector output for the signal received by retransmission, and the absolute value of the sampled value of the aforementioned detector output for a previously received signal, which is stored in the aforementioned memory; and (2) a means which selects the sampled value with the larger absolute value.

A time diversity receiver according to this invention includes a sampling circuit which samples the detector output, and a memory which stores these sampled values. The time diversity processing means includes a means which adds, for each symbol of identical received signals, the sampled value of the detector output for the signal received by retransmission, and the sampled values of the aforementioned detector output for previously received signals, which are stored in the aforementioned memory.

A time diversity receiver according to this invention comprises, as the means which receives a signal comprising the same symbols a plurality of times, a means which repeatedly receives frames comprising n fixed-length subframes (where n is a natural number equal to or greater than 2) each of which contains a paging signal for each receiver, the frames being constituted so that a new paging signal is inserted in the subframe arranged at one end of the frame, while a paging signal which is being transmitted for the second or a subsequent time is inserted in the subframe arranged at a position corresponding to the number of transmissions.

According to this invention, a receiver for time diversity reception, which achieves high quality reception by performing time diversity processing on paging signals wherein a signal comprising the same symbols is transmitted a plurality of times, performs the time diversity processing by means of sampled values of the detector output, without having to carry out receiving level detection. A receiving level detector is therefore not required.

Time diversity pressing is performed by comparing the absolute values of the sampled values of the detector output for a signal that has just been received, and the absolute values of the sampled values of the detector output for a previously received signal, and selecting the larger sampled values. At the same time as this, the sampled values after the time diversity reception processing has been carried out are written to memory and symbol decision is carried out on each symbol.

Time diversity processing can also be performed on the basis of addition, without comparison of sampled values.

Thus, because time diversity reception processing in this invention is performed using only the detector output, there is no need for circuits pertaining to receiving level detection and therefore the circuitry becomes simpler. Likewise, because the power consumption involved in a receiving level detection circuit is eliminated, a receiver according to this invention has a lower power consumption.

OPTIMUM CONFIGURATIONS FOR EMBODYING THIS INVENTION

Embodiment 1

Figure 2:
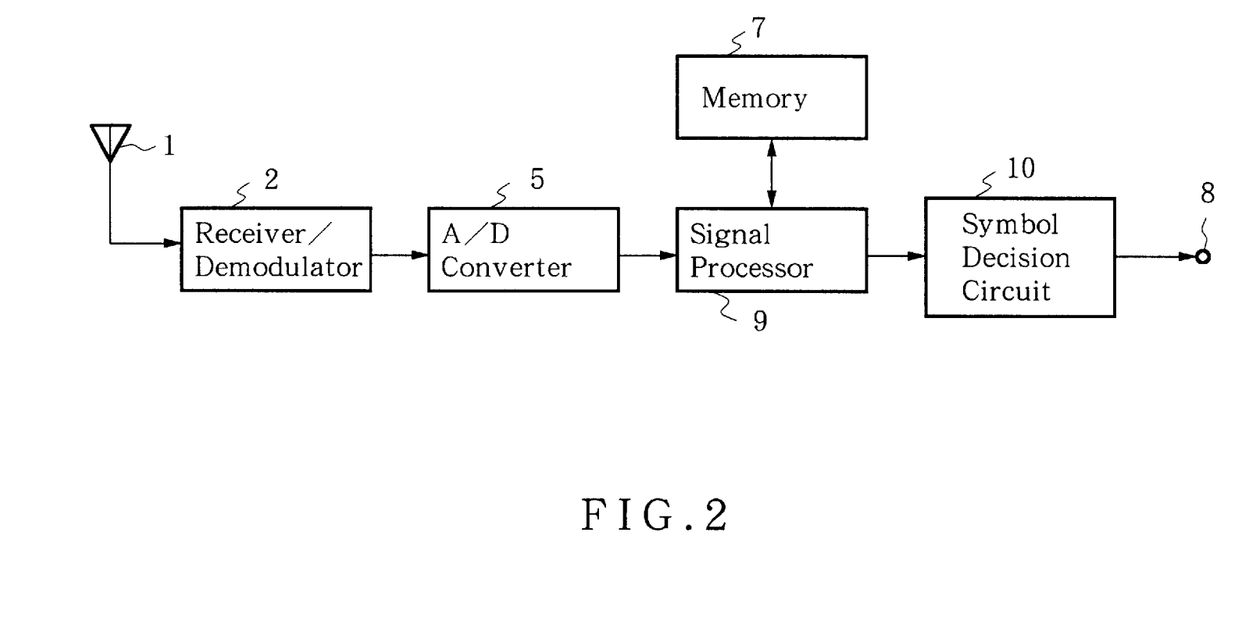
FIG. 2 shows the constitution of a time diversity receiver according to a first and a second embodiment of this invention, FIGS. 3(a)–3(b) explain the time diversity processing of the detector output according to the first embodiment, with FIG. 3a showing the detector output for a signal received for the first time and FIG. 3b showing the detector output for a signal received for the second time.

The constitution of a first embodiment of this invention will be explained with reference to FIG. 2. A time diversity receiver according to this embodiment has antenna 1, receiver/demodulator 2, which receives and demodulates the signal received via antenna 1, A/D converter 5 which serves as a sampling circuit which samples the detector output, memory 7 which stores the sampled values, signal processor 9 which performs time diversity processing, and symbol decision circuit 10. Signal processor 9 comprises a means which compares, for each symbol of identical received signals, the absolute value of the sampled value of the detector output for the signal received by retransmission, and the absolute value of the sampled value of the aforementioned detector output for a previously received signal, which is stored in the aforementioned memory; and a means which selects the sampled value with the larger absolute value; and a means which writes the sampled values after time diversity reception processing to the aforementioned memory, and at the same time outputs said sampled values to symbol decision circuit 10 for symbol decision.

The operation of a receiver according to this embodiment will now be explained. Receiver operation will be explained for the case where binary code is being received.

Signals received via antenna 1 are input to receiver/demodulator 2. Each symbol of the detector output signal that is output from receiver/demodulator 2 is sampled in A/D converter 5 and input to signal processor 9. Signal processor 9 performs time diversity reception processing by calculating, for each symbol, a value Z which satisfies the following equation:

$$|Z|=\max(|X|, |Y|) \qquad \ldots (1)$$

where X is the sampled value of the signal that has just been received and Y is the sampled value of an identical signal received prior to the signal that has just been received, this latter value being taken from memory 7. After completion of this time diversity reception, signal processor 9 stores these sampled values Z in memory 7 and also outputs them to symbol decision circuit 10. Symbol decision circuit 10 performs symbol decision on sampled values Z as binary data (0 or 1) and outputs this binary data to terminal 8. By repeating these operations, high-quality signal transmission can be achieved in mobile radio communication channels which are subject to fading. The symbol decision performed by symbol decision circuit 10 can also be carried out by signal processor 9, and in this case it is not necessary to provide a separate symbol decision circuit 10.

The operation of this embodiment will be explained in more explicit terms with reference to FIG. 3(a)–3(b), which serves to explain the operations whereby time diversity processing is performed by sampling the detector output signal and comparing the absolute values of the sampled values.

Figure 3:
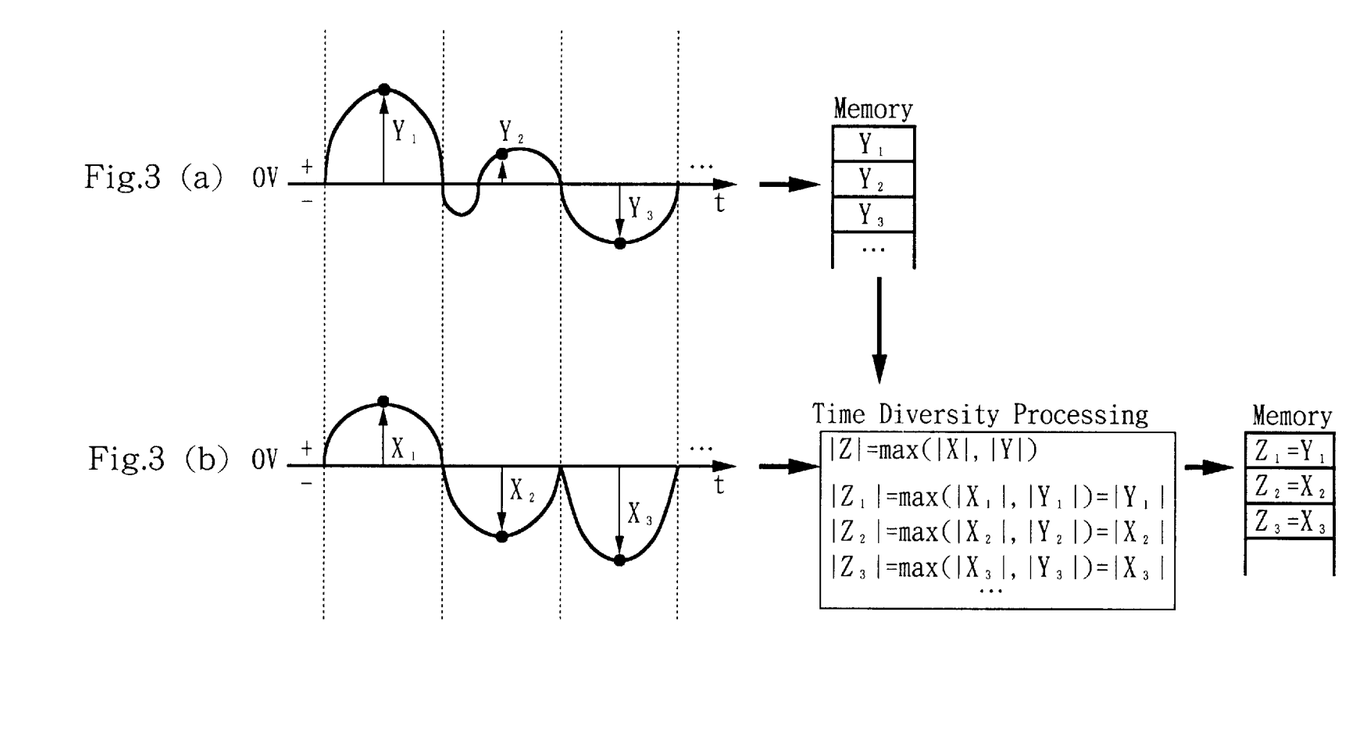

The detector output for a signal received for the first time is assumed to have a waveform of the sort shown in FIG. 3a. Sampled values $Y_1, Y_2, Y_3, \ldots$ can be obtained by sampling this waveform with prescribed sampling timings. These sampled values obtained for the first time are stored in memory 7 and are also output to symbol decision circuit 10. Next, the detector output for a signal received for the second time is assumed to have a waveform of the sort shown in FIG. 3b. The sampled values obtained by sampling this detector output will be $X_1, X_2, X_3, \ldots$ Signal processor 9 compares the absolute values of the sampled values $Y_1, Y_2, Y_3, \ldots$ obtained the previous time and which were stored in memory 7, and the absolute values of the sampled values $X_1, X_2, X_3, \ldots$ which have just been obtained. The sampled values with the larger absolute values are stored in memory 7 as $Z_1, Z_2, Z_3, \ldots$ and are output to symbol decision circuit 10. In the present case, comparison of the absolute values of $Y_1$ and $X_1$ shows that $Y_1$ is larger. In the case of $X_2$ and $Y_2$, although these are of opposite sign, $X_2$ has the larger absolute value. Accordingly, the sampled values $Y_1, X_2, X_3, \ldots$ will be stored in memory 7 as the sampled values $Z_1, Z_2, Z_3, \ldots$ after time diversity processing.

The inventors have previously presented, in PCT/JP94/00107 and PCT/JP94/00289, a paging signal frame system wherein the number of times a paging signal has been transmitted can be recognized at the receiver side. This system serves as a frame signal format in a radio paging system wherein a signal comprising the same symbols is transmitted a plurality of times, and it is suited to a time diversity system according to this embodiment.

Figure 4:
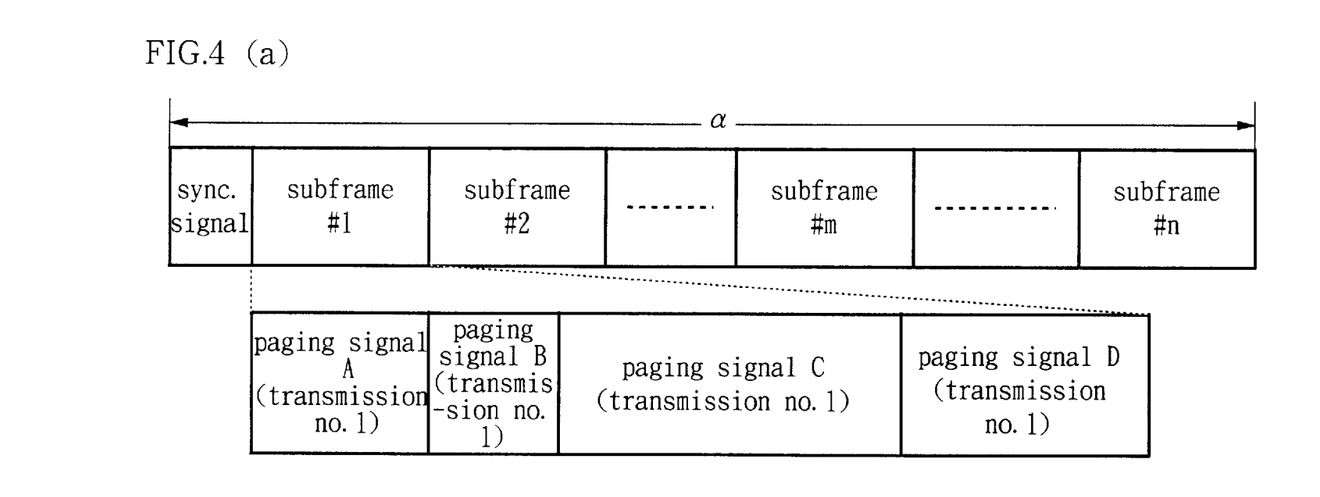
FIGS. 4(a)–4(b) illustrate a frame signal format suited to embodiments of this invention, with FIG. 4a showing the constitution of the time s0 frame and FIG. 4b showing the constitution of the time s0+T frame.

An example of this frame signal format is given in FIG. 4, where it is assumed that a pager which repeatedly receives a frame of signal length α will first of all receive the time s0 frame and then receive the time s0+T frame. The constitution of the time s0 frame is shown in FIG. 4a and the constitution of the time s0+T frame is shown in FIG. 4b. T is the frame period.

Internally, these frames comprised fixed-length subframes following a frame synchronization signal, with one or more new paging signals being inserted in the first subframe and a paging signal that is transmitted for the $m^{th}$ time being inserted in the $m^{th}$ subframe. Focusing on one paging signal, it will be seen that its position shifts by one subframe every frame period. Referring to the examples shown in FIG. 4a and 4b, if paging signals A, B, C and D have been inserted in the first subframe of the time s0 frame, these paging signals A, B, C and D will be inserted in the second subframe of the time s0+T frame and in the $k^{th}$ subframe of the time s0+(k−1)T frame (where k=1, . . . n). Transmission for the $n^{th}$ time will be completed in the time s0+(n−1)T frame. In other words, because the position of a paging signal in the frame in successive transmission periods will change in a regular manner, so that the position of a paging signal being transmitted for the second or subsequent time can be predicted at the receiver side, and because identical paging signals are comprised of identical bits, when time diversity processing is performed at signal processor 9, identical received signals can be extracted and compared symbol by symbol.

Figure 5:
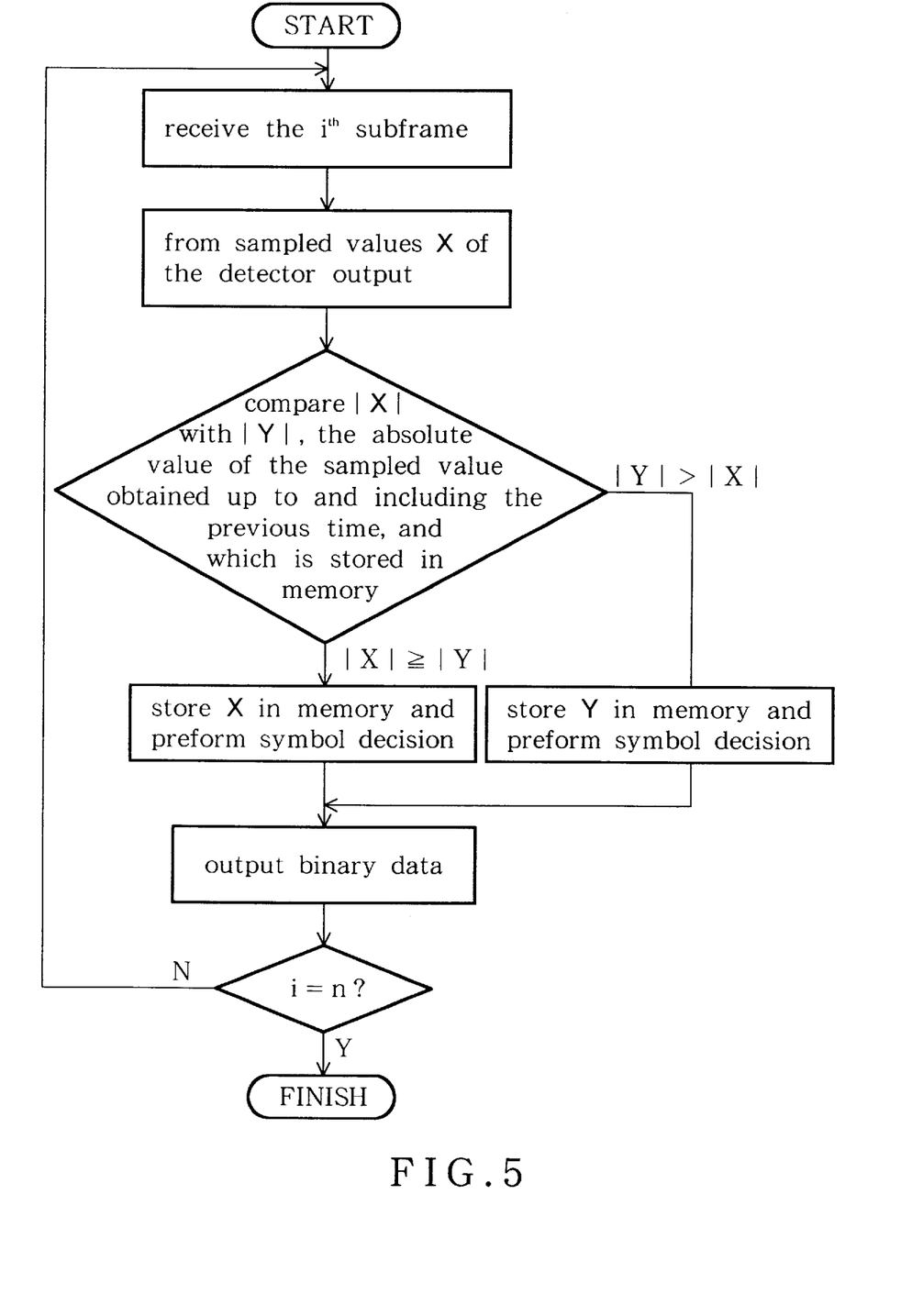
FIG. 5 is a flowchart showing the time diversity processing in the first embodiment of this invention.

An example of the working of time diversity processing in a radio paging system according to this embodiment, using the frame signals shown in FIG. 4, is shown as a flowchart in FIG. 5. Note that this flowchart relates to subframe which contains identical signals.

A time diversity receiver according to the embodiment described above enables time diversity reception processing to be performed by application of the detector output only, without having to carry out receiving level detection.

Embodiment 2

A second embodiment of this invention will now be explained. The constitution of the receiver is the same as in the first embodiment, but the time diversity reception processing in signal processor 9 differs from that employed in the first embodiment.

It should be noted that the operation of the transmitting side involves transmitting a signal comprising the same symbols a plurality of times, which is similar to a conventional system, and that the receiver will be explained for the case where binary code is being received.

Signals received via antenna 1 are input to receiver/demodulator 2. Each symbol of the detector output signal that is output from receiver/demodulator 2 is sampled in A/D converter 5 and input to signal processor 9. Signal processor 9 performs time diversity reception processing by calculating, for each symbol, a value Z which satisfies the following equation:

$$Z = X + Y \qquad \ldots (2)$$

where X is the sampled value of the signal that has just been received and Y is the sampled value of an identical signal received prior to the signal that has just been received, this latter value being taken from memory 7.

After completion of this time diversity reception processing, signal processor 9 stores these sampled values Z in memory 7 and also outputs them to symbol decision circuit 10. Symbol decision circuit 10 performs symbol decision on sampled values Z as binary data and outputs this binary data to terminal 8. By repeating these operations, high-quality signal transmission can be achieved in mobile radio communication channels which are subject to fading.

Figure 6:
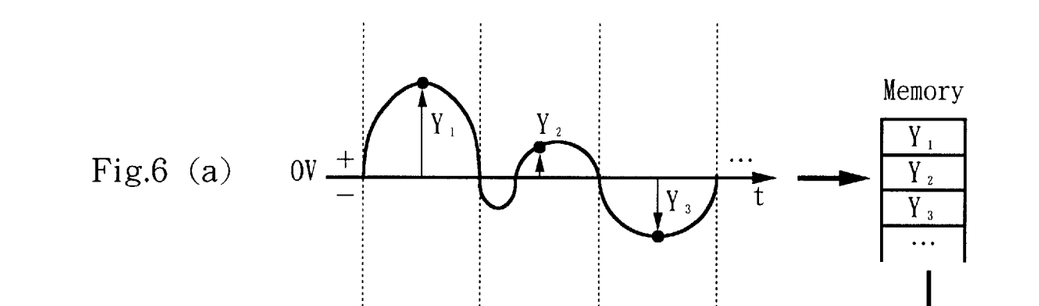
FIGS. 6(a)–6(b) explain the time diversity processing of the detector output according to the second embodiment with FIG. 6(a) showing the detector output for a signal received for the first time and FIG. 6(b) showing the detector output for a signal received for the second time.

The operation of this embodiment will now be explained in more explicit terms with reference to FIGS. 6(a)–(b). In similar fashion to the first embodiment, the detector output for a signal received for the first time is assumed to have had the waveform shown in FIG. 6a. This waveform is sampled with prescribed sampling timings, whereupon sampled values $Y_1, Y_2, Y_3, \ldots$ are obtained. These sampled values obtained for the first time are stored in memory 7 and are also output to symbol decision circuit 10. Next, the detector output for the signal received for the second time is assumed to have the waveform depicted in FIG. 6b. The sampled values obtained by sampling this detector output will be $X_1, X_2, X_3, \ldots$. Signal processing part 9 performs addition of the sampled values $Y_1, Y_2, Y_3, \ldots$ obtained the previous time, which were stored in memory 7, and the sampled values $X_1, X_2, X_3, \ldots$ that have just been obtained, and $Z_1 = X_1 + Y_1, Z_2 = X_2 + Y_2, Z_3 = X_3 + Y_3, \ldots$ are stored in memory 7 as the sampled values after time diversity processing, and are also output to symbol decision circuit 10.

Figure 7:
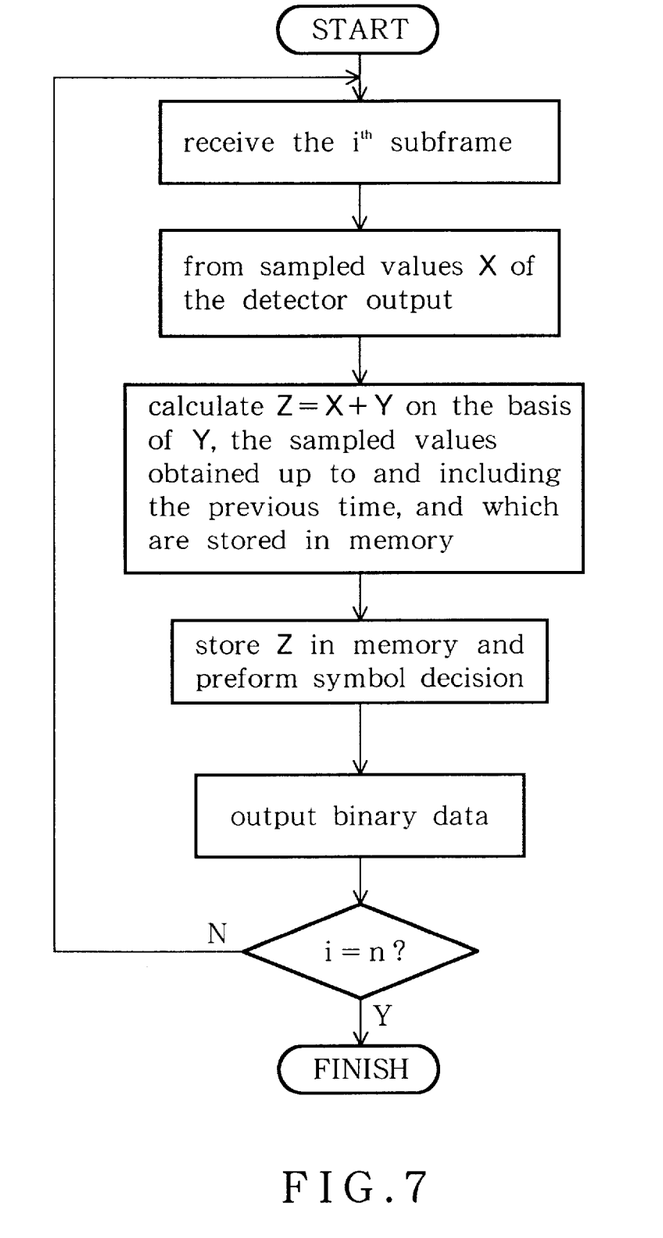
FIG. 7 is a flowchart showing the time diversity processing in the second embodiment of this invention.

The working of time diversity processing in a radio paging system according to this second embodiment, using the frame signals shown in FIG. 4, is shown as a flowchart in FIG. 7. Note that this flowchart relates to a subframe which contains identical signals.

A time diversity receiver according to the embodiment described above enables time diversity reception processing to be performed by application of the detector output only, without having to carry out receiving level detection.

Although the working of the first and second embodiments described above has been explained for the case where binary code is received, this invention is similarly effective in cases where three-valued or higher valued codes are received. In such cases, the symbol decision circuit should correspond to the number of values of the code being used.

We claim:

1. A time diversity receiver comprising:

a detector that receives a radio signal comprising the same symbols transmitted a plurality of times and that outputs an analog detector signal corresponding thereto;

a sampling circuit which samples said analog detector signal and outputs sampled digital detector signals, each of said sampled digital detector signals being indicative of an amplitude of said analog detector signal;

a memory which stores said sampled digital detector signals;

a time diversity processor which compares, for each symbol of associated received signals, an absolute value of a first sampled digital detector signal and an absolute value of a second sampled digital detector signal corresponding to a previously received signal which is stored in said memory, and which selects one of said first and said second sampled digital detector signals having a larger absolute value as a time diversity processor output signal; and a symbol decision circuit that receives said time diversity processor output signal and performs a symbol decision function thereon.

2. A time diversity receiver comprising:

a detector that receives a radio signal comprising the same symbols transmitted a plurality of times and outputs an analog detector signal;

a sampling circuit which samples said analog detector signal and outputs sampled digital detector signals, each of said sampled digital detector signals being indicative of an amplitude of said analog detector signal;

a memory which stores said sampled digital detector signals output by said sampling circuit;

a time diversity processor which is adaptable to receive a plural number of said sampled digital detector signals and adds, for each symbol of associated received signals, a first sampled digital detector signal and a second sampled digital detector signal corresponding to a previously received signal which is stored in said memory to produce a time diversity processor output signal; and a symbol decision circuit that receives said time diversity processor output signal and performs a symbol decision function thereon to produce a symbol decision circuit output signal wherein said symbol decision function is performed after the addition by said time diversity processor is performed.

3. A time diversity receiver comprising:

a detector that receives a signal comprising the same symbols transmitted a purality of times and that outputs a detector signal corresponding thereto; and a time diversity processor which performs time diversity reception processing using a first detector signal corresponding to a received signal and a second detector signal corresponding to a previously received signal, wherein said detector is adapted to receive frames comprising n fixed-length subframes repeatedly, where n is a natural number equal to or greater than 2, each frame including a paging signal for each receiver, said frames being constituted so that a new paging signal is inserted in the subframe arranged at one end of a frame a first time that frame is transmitted, while a subsequent time that frame is transmitted, said paging signal is inserted into a subframe of that frame at a position corresponding to the number of transmissions.

4. A time diversity receiver comprising:

a detector that receives a signal comprising the same symbols transmitted a plurality of times and that outputs a detector signal corresponding thereto;

a sampling circuit which samples said detector signal and outputs sampled detector signals;

a memory which stores said sampled detector signals; and a time diversity processor which compares, for each symbol of associated received signals, an absolute value of a first sampled detector signal, and an absolute value of a second sampled detector signal corresponding to a previously received signal which is stored in said memory, and which selects one of said first and said second sampled detector signal having a larger absolute value, wherein said detector is adapted to receive frames comprising n fixed-length subframes repeatedly, where n is a natural number equal to or greater than 2, each frame including a paging signal for each receiver, said frames being constituted so that a new paging signal is inserted in the subframe arranged at one end of a frame a first time that frame is transmitted, while a subsequent time that frame is transmitted, said paging signal is inserted into a subframe of that frame at a position corresponding to a number of transmissions.

5. A time diversity receiver comprising:

a detector that receives a signal comprising the same symbols transmitted a plurality of times and a detector signal;

a sampling circuit which samples said detector signal;

a memory which stores sampled signals output by said sampling circuit;

a time diversity processor which adds, for each symbol of associated received signals, a first sampled detector signal and a second sampled detector signal corresponding to a previously received signal which is stored in said memory, wherein said detector is adapted to receive frames comprising n fixed-length subframes repeatedly, where n is a natural number equal to or greater than 2, frame including a paging signal for each receiver, said frames being constituted so that a new paging signal is inserted in the subframe arranged at one end of a frame a first time that frame is transmitted, while a subsequent time that frame is transmitted, said paging signal is inserted into a subframe of that frame at a position corresponding to a number of transmissions.

* * * * *